United States Patent

[11] 3,587,646

| [72] | Inventor | Frederick John Adams<br>Campton, near Shefford, England |
|---|---|---|
| [21] | Appl. No. | 741,630 |
| [22] | Filed | July 1, 1968 |
| [45] | Patented | June 28, 1971 |
| [73] | Assignee | Cam Gears Limited<br>Hitchin, England |
| [32] | Priority | July 6, 1967, June 14, 1968 |
| [33] | | Great Britain |
| [31] | | 31110/67 and 28438/68 |

[54] FLUID CONTROL VALVE WITH RADIALLY DRILLED PARTS
10 Claims, 5 Drawing Figs.

[52] U.S. Cl. .................................................. 137/625.17,
    137/625.68
[51] Int. Cl. ........................................................ F16k 11/00
[50] Field of Search ............................................. 137/625.17,
    636.4, 625.67, 625.68, 625.69; 29/(Inquired),
    157.1, 156.7; 251/325, 324, 343, 344, 385, 207,
    209

[56] References Cited
UNITED STATES PATENTS

| 2,143,565 | 1/1939 | Minea | 251/207X |
| 2,592,371 | 4/1952 | Ackroyd | 251/325X |
| 2,931,673 | 4/1960 | Gondek | 251/325 |
| 2,987,078 | 6/1961 | DuPerow | 251/209X |
| 3,004,555 | 10/1961 | Haberland | 237/625.68 |
| 3,095,907 | 7/1963 | Latham, Jr. | 137/625.67 |

*Primary Examiner*—William R. Cline
*Attorney*—Hill, Sherman, Meroni, Gross and Simpson

ABSTRACT: The invention described concerns the construction of (and a method of constructing) fluid control valves of either rotary or spool type in which ports are of circular formation and are formed by drilling into the cylindrical interface of the inner valve member, and further involves the practical application of such valves in hydraulic power steering.

Inventor
Frederick John Adams

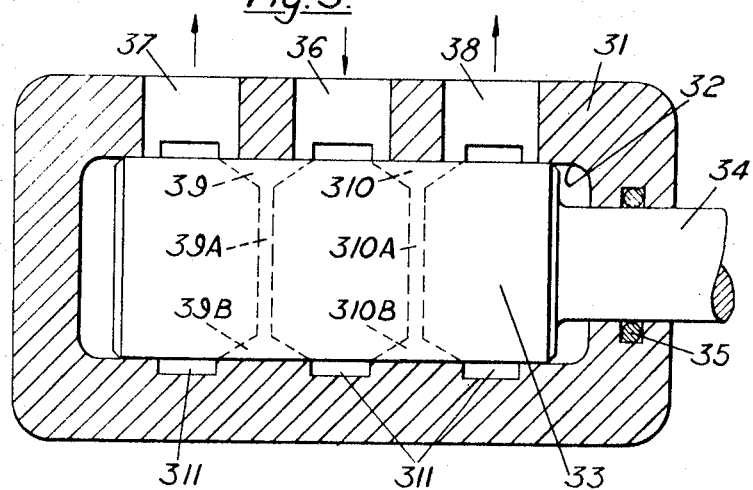
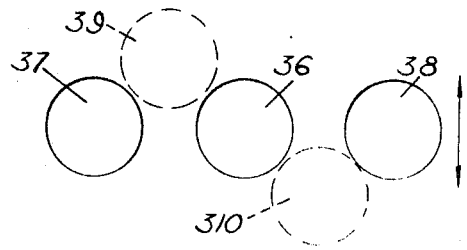
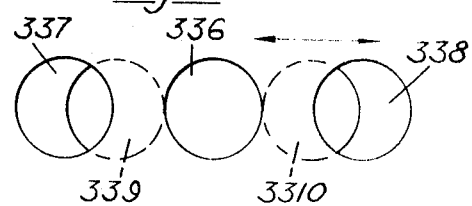
Inventor
Frederick John Adams

FLUID CONTROL VALVE WITH RADIALLY DRILLED PARTS

This invention relates to fluid control valves (and more particularly two-way hydraulic control valves), a method of making the same, and the particular application for which such valves are primarily intended, namely hydraulic power-assisted vehicle steering.

In particular, valves according to the invention are of the kind in which limited rotary action, usually but not essentially from an open-center neutral position, controls flow of pressure fluid (usually but not necessarily liquid) from a source, in either of two senses of direction in a circuit, simultaneously allowing return of fluid for example to a reservoir. Hitherto, valves of this kind have often had a rotary and a body member which had cooperating lands and grooves as well as ducts to connect them. The present invention, aiming at simplicity and low cost, involves instead very simply machined bores and "-dimples" i.e. blind bores, all lending themselves to easy, accurate manufacture and also to a means of adjustment which is highly convenient.

In its preferred application, namely to hydraulic power-assisted vehicle steering gear, the invented valve has the known device of a torsionally elastic bar, the strain in which determines the rotary operation of the valve; and may also have (as in known practice) the provision of a loose dog coupling which can transmit all the required torque should there be a failure of the assisting power.

The invention relates specifically to valves of the kind in which an inner member of circular cross section moves in a cylindrical bore in an outer member. The invention is primarily intended to be applied where such a valve is itself completely rotatable in a casing which is stationary; it thus belongs to a type of valve frequently used in hydraulic power-assisted vehicle steering gear in which the valve as a whole is rotatable by the action of steering and its two parts are partially relatively rotatable according to the strain imposed in a torsionally elastic member in the act of steering such valve consequently being torque sensitive both as to sense of operation and extent of operation.

The invention is further applicable in a somewhat broader context in that it may be applied to a valve of the spool type, that is to say one in which the inner member moves axially within the outer and such valves are applicable in all manner of hydraulic and pneumatic systems.

A principal aim of the present invention is to provide a valve which can be made to precise limits and will be accurate in operation, which is highly economic in manufacture and which is if necessary sensitively adjustable by simple means.

According to the invention in one aspect a valve of the kind which has an inner member of circular cross section moveable in the cylindrical bore of an outer member is provided in one or both members with ports or transition passages which are formed simply by a drilling operation and are therefore each in itself of circular cross section and these ports are so disposed that in the action of the valve their margins by overlapping their port or channel formations vary the effective blind-passage area and thus control fluid flow.

The invention also includes a method of making ports in a rotary of spool-type fluid control valve by drilling depressions or blind bores into a surface of a member of the valve mating with an adjacent valve member to control flow and thereby avoiding heretofore necessary cooperating lands and grooves which are much more expensive to produce.

Again in accordance with the invention there is preferably provided a row of the aforementioned ports in a member, arranged in a staggered or helical manner, so that whether the valve be one which operates by rotation or by axial movement the overlap area resulting from operation may be rendered highly sensitive either in the valve operation itself or with reference to the adjustment which may be made for example to the neutral position of such a valve especially if it be of the open-center king. By sensitivity of operation we mean that a comparatively small relative movement of the valve ports effects a comparatively large change of passage area.

The circularly formed ports above referred to may be in one or both of the valve members; in preferred embodiments they are blind bores formed in the interface of the inner member, and acting as transfer ports between passages drilled through the outer member; or the bores in the inner member are frustoconical drilled recesses which may actually be interconnected through the member by straightforward drilled passages which can economically be formed as diametral drillings.

It results from the application of the invention that a minimum of relatively expensive machining is employed in the making of a valve or at least of the inner member. The invention may of course be applied with passage ways formed by milling or turning but in proposed embodiment of the invention these operations are not necessary in the making of a valve for example such as an axially moving valve in which a spool slides in a sleeve; a feed duct is drilled through the sleeve in a median region thereof and two supply ducts are drilled to take fluid away from the bore, transfer between the feed and either supply duct being by way of drillings in the spool.

By dimensioning and positioning the ports, a required valve law may be achieved. For example, open-center or closed-center operation is quite simply provided for by arranging for an overlap in the neutral position or a complete cutoff; and by locating the the ports in selected "stagger" it may be that the sensitivity as above mentioned, may be selected. Thus it may be that initial very small valve movement results in a very small effective passage area, which area rapidly increases with further relatively small movement. If the converse effect be required (i.e. a diminishing spring-rate with increase of movement) this can be arranged by one set of ports closing (as to passage area) more rapidly than another set opens.

In order to balance fluid pressure on a diameter of the valve, recesses at the opposed ends of a diameter may be interconnected by a small drilled bore in the core of the inner member; an annular groove in the core of outer member may be used for pressure balance.

The invention also includes the application of such a valve in a hydraulic power steering system for vehicles, the valve being adapted to that purpose, as will become clear from the following description which deals with such adaptation as an example.

The following description refers to the accompanying drawings, in which:

FIG. 3 is a diagrammatic sectional illustration of a rotary type valve according to the invention;

FIG. 4 illustrates the relationship of the ports of FIG. 3; and

FIG. 5 illustrates the relationship of the ports if a valve generally like that of FIG. 3 is adapted to act as a slide (i.e. spool type) valve.

The difference between FIGS. 4 and 5 is in itself a good indication of the extreme simplification of manufacture resulting from the invention in that a complete valve on the lines of FIG. 3 can be applied either as a rotary or as a spool valve merely by varying the locations at which—in principle—two dimples are drilled. It may even be practicable to make a valve which without any change at all can be used as either a rotary valve, or as a spool valve, or as a valve operable both by rotation and sliding.

Figure 1:
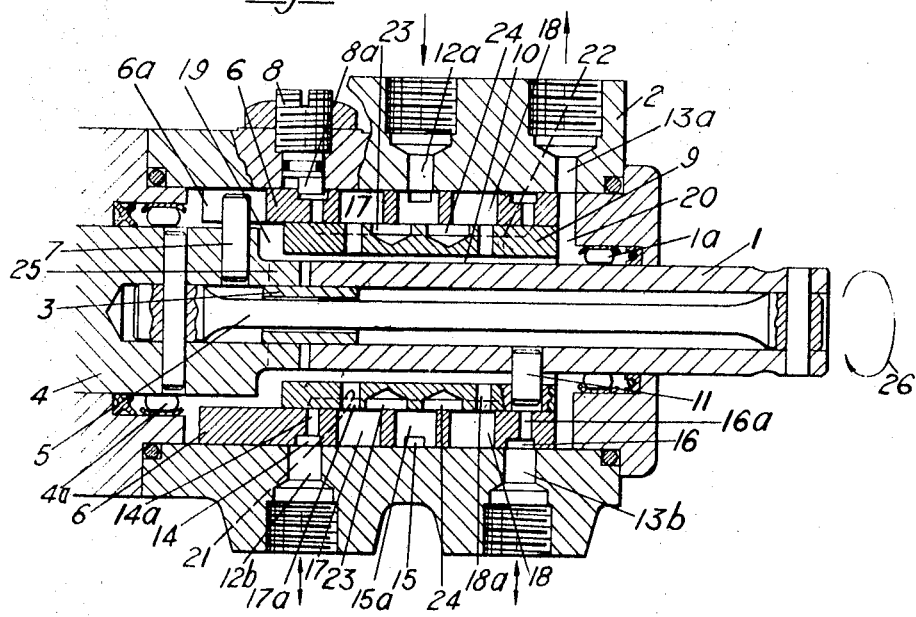
FIG. 1 is a sectional view of the exemplary valve but is not to be read as a true simple-plane section; the radial positions of duct details have been distorted round the main axis to facilitate understanding of the operation.
Figure 2:
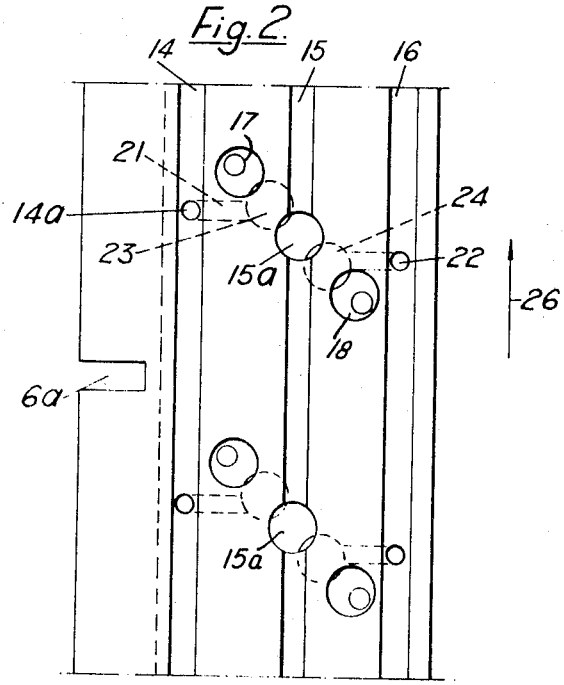
FIG. 2 illustrates by way of flat "development" the ducting and passages at the interface of the body and the valve element.

Turning now to FIGS. 1 and 2, the spindle 1 is connected at its right hand end to the steering column: it is rotatable in a needle bearing 1a in a fixed end element of the steering box 2. Spindle 1 is hollow and at its left hand end is located by a bush 3 in axial alignment with output shaft 4. Pinned to spindle 1 and shaft 4 is the torque bar 5. Shaft 4 is borne by needle bearings 4a in the box 2.

Within the box 2 there is rotatably mounted a valve body 6 having an axially directed slot 6a receiving a pin 7 which projects radially from the shaft 4. The pin 7 engages the slot walls to connect the shaft 4 and the body 6 for common rotation while allowing the body 6 to shift axially relative to the shaft 4. Axial movement of body 6 (for valve adjustment) is effected by an externally accessible stud 8 which has an eccentric end 8a engaged in a peripheral groove 14 of the body 6. Rotation of 8 adjusts 6 axially (and as will be seen, thereby adjusts the "neutral" condition of the valve). The body 6 is axially bored and houses rotatable the valve element 9, which surrounds the spindle 1 with substantial radial clearance forming a passageway 10. The element 9 is fixed against rotation relative to the spindle 1 by a pin 11 which as seen is remote from the pin 7; this arrangement provides that the torsional strain in the rod 5 entails relative rotation between 6 and 9 proportional to the torque and in corresponding sense.

Through the wall of the box 2 are radially-bored ducts 12a, 12b and 13a, 13b. Duct 12a leads from the power pump and 13a leads back to the reservoir (note arrows, FIG. 1). Ducts 12b and 13b are connected to the two respective ends of the double acting actuator ram which assists steering, and the flow through them is either nil (when the valve is neutral) or in one of the two alternative senses of steering direction.

The valve body 6 has three external annular grooves 14, 15 and 16; these are shown "developed" in FIG. 2. Groove 15 is always open to duct 12a and consequently is always at pump pressure; it has two radial bores 15a, through the body 6, which open at the interface of the bore of body 6 and element 9. Groove 14 is open to duct 12b; groove 16 is open to duct 13b. The body 6 has also two radial bores 17 on a diameter and a second like pair 18. These (17,18) communicate with bores 17a, 18a, respectively, through the element 9 and opening inwardly into passageway 10. At the left end of the valve element 9 is left a space 19 and at the right end a space 20, these being open to passageway 10. The groove 14 has bores 14a and groove 16 has bores 16a, through the body 6 and opening into grooves 21,22, respectively, which are shown in broken lines (clearly in FIG. 2).

The outer surface of valve element 9 has shallow dimples machined in it, namely a diametrically opposite pair 23 and another 24.

The left end of the spindle 1 and right end of the shaft 4 can engage by a loose dog coupling at 25 should there be a failure.

Operation is as follows: in the neutral position of the valve (little or no steering torque) all the ducts, bores and passageways above mentioned are filled with fluid at uniform pressure.

Taking now steering to one sense of direction as indicated by the arrow 26, and for brevity simply using the references, pump pressure is exerted in 12a, 15, 15a, 24, 22, 16, to 13b. Return is from 12b through 14, 14a, 21, 23, 17, 17a, 10, 20, to 13a. It will be noted that the dimples 23,24 act as transfer ports; and that the passageway 10 and connected ducts are at low pressure. Steering to the opposite sense reverses the flow, i.e. it is from 12a to 12b; return is from 13b to 13a.

As can be seen from FIG. 2, the grooves 14, 15 and 16 extend all round the body 6. As to adjustment by the eccentric 8a, the effect thereof in relation to FIG. 2 is to be imagined as moving the two valve parts relatively to left and right of the FIG. It follows that the overlapping of the ducts and transfer passages is thereby varied so that a truly neutral open-center relationship (as is represented in FIG. 2) can be found by such adjustment. The fact that the various passages which are to overlap are arranged in a helical array enables such adjustment to be exact and sensitive. The adjuster 8, being externally accessible, can be used whatever is the position of the steering gear: so if required for example the valve "neutral" could be found even with the gear on full lock. There is no need to line up the road wheels. As will have been noted, almost all the manufacturing operations are turning and boring.

FIGS. 3, 4 and 5 are entirely schematic. In these illustrations, a valve sleeve 31 has a cylindrical bore 32. An inner valve member 33 of generally cylindrical form is rotatable (or in the second example slidable) in the bore 32; and member 33 has a stem 34 borne and sealed at 35 in the end of the sleeve 31. In the wall of the sleeve 31 is a supply duct 36 formed simply as a radial bore, and two outlet ducts 37 and 38 formed in the same manner. In the member 33 are formed two "dimples" 39 and 310, which (as can be seen from FIG. 2) are staggered as to their positions, 39 lying to one side of the axial alignment of 36, 37 and 38, and 310 lying to the other side. It follows by the location of these dimples that if the member 33 is rotated in one sense, a dimple (for example 39) acts as a transfer port interconnecting two ducts (for example 36 and 37) and rotation in the opposite sense interconnects the alternative circuit (for example 36 and 38).

To achieve pressure balance, each duct 36, 37, 38 may open into an annular groove such as 311. Moreover the dimple 39 may be connected by a drilled bore 39a to a diametrically opposite dimple 39b; and dimple 310 likewise by 310a to 310b.

If a valve basically like that of FIG. 3 be required as a spool valve, its formation is as shown in FIG. 5. In this FIG., corresponding drillings (ports and dimples) have similar references preceded by 3. In this case the ducts 336, 337, 338 are again axially aligned, but the dimples 339, 3310, are also similarly aligned and are in the axially moving spool.

In these examples, both are shown as closed-center valves; if open-center effect is required, then obviously the dimples 39 and 310 (or 339 and 3310) would be positioned so as to overlap both 36, and 37 and 38; or both 336, and 337 and 338, in the neutral condition.

Consideration of FIG. 4 also shows that a valve made as in FIGS. 3 and 4 could be used as a rotary or as a spool valve, or a simple such valve could be used so as to act by rotary or axial movement, with advantageous versatility.

The term "slidably" as used herein denotes both rotatable sliding movement and axial sliding movement.

I claim:

1. A fluid control valve comprising a valve body having a cylindrical bore, an inlet port communicating with the central portion of the bore, control ports on each side of the inlet port, and an outlet port communicating with the ends of the bore, a cylindrical valve body sleeve slidably fitting in said cylindrical bore of the valve body having a central peripheral groove registering with the inlet port and a peripheral groove on each side of said central groove each registering with a control port, a plurality of peripherally spaced holes through the bottom of each groove in said sleeve body, a cylindrical valve element slidable in said sleeve body, a plurality of circumferentially spaced blind dimples in the outer periphery of said valve element positioned to selectively communicate the holes in the central groove of the body sleeve with holes in the bottoms of the grooves on each side of the central groove of the body sleeve and with the outlet port, and means for shifting said body sleeve and said valve element together in opposite directions and relative to each other for selectively communicating the inlet port with a first control port and the outlet port with a second control port or connecting the inlet port with the second control port and the outlet port with the first control port.

2. The fluid control valve of claim 1 including means for shifting the body sleeve axially in the bore of the valve body to align the grooves with the ports of the valve body.

3. The fluid control valve of claim 1 wherein the body sleeve is rotatable in the valve body bore, the valve element is rotatable in the body sleeve, a first drive means rotates the drive element and a second drive means rotates the body sleeve.

4. The fluid control valve of claim 3 wherein the first and second drive means are connected by a torsion bar.

5. A fluid control valve adapted for power steering gear which comprises a valve body having a cylindrical bore, a valve body sleeve slidably fitting in said cylindrical bore, a cylindrical valve element slidably fitting in said sleeve, means relatively positioning the sleeve and valve element to control the flow of fluid into and out of the valve body, said sleeve having a plurality of rows of circumferentially spaced holes therethrough, and said valve element having a plurality of circumferentially spaced blind transfer ports in the outer periphery thereof selectively communicating and isolating the holes in the respective rows of the sleeve.

6. The fluid control valve of claim 5 wherein the blind transfer ports are helically staggered on the periphery of the valve element.

7. The fluid control valve of claim 5 wherein the valve element is rotatable in the valve sleeve and the valve sleeve is rotatable in the valve body.

8. A fluid control valve adapted for hydraulic power steering gear which comprises a valve body having an inlet port, a pair of control ports, and an outlet port, a valve sleeve rotatably mounted in the valve body having a plurality of circumferential grooves therearound adapted to receive fluid from the ports of said body, a cylindrical valve element rotatable in said valve sleeve, circular holes through the bottoms of the grooves in said sleeve, blind bore transfer passages in the periphery of said valve element, said holes and blind bore transfer passages being so positioned to shut off and establish communication selectively between the grooves of the sleeve and ports of the valve body upon relative rotation of the valve element and sleeve, means for rotatably driving said valve element, torsion bar means connected to said driving means for driving said valve sleeve in trailing relation to the valve element whereby rotation of the driving means in opposite directions will selectively control flow to and from the control ports of the valve body.

9. The fluid control valve of claim 8 having open center flow wherein the sleeve has a hole overlapping two blind bore transfer passages in the valve element in one position thereof and wherein relative movement of the sleeve and valve element from said position in either direction cuts off one of the blind bores and increases the overlap of the other blind bore.

10. The fluid control valve of claim 8 wherein the sleeve is also axially slidable in the valve body, and the valve body has adjustment means accessible from outside the body for axially shifting said sleeve relative to the ports of the valve body.